United States Patent
Han et al.

(10) Patent No.: US 12,299,330 B2
(45) Date of Patent: May 13, 2025

(54) METHOD, DEVICE, AND COMPUTER PROGRAM PRODUCT FOR PROCESSING WRITE CONFLICTS

(71) Applicant: Dell Products L.P., Round Rock, TX (US)

(72) Inventors: Geng Han, Beijing (CN); Jianbin Kang, Beijing (CN); Jibing Dong, Beijing (CN)

(73) Assignee: Dell Products L.P., Round Rock, TX (US)

( * ) Notice: Subject to any disclaimer, the term of this patent is extended or adjusted under 35 U.S.C. 154(b) by 6 days.

(21) Appl. No.: 18/221,554

(22) Filed: Jul. 13, 2023

(65) Prior Publication Data
US 2024/0231679 A1    Jul. 11, 2024

(30) Foreign Application Priority Data

Jan. 6, 2023 (CN) .......................... 202310020620.0

(51) Int. Cl.
*G06F 3/06* (2006.01)
(52) U.S. Cl.
CPC .......... *G06F 3/0659* (2013.01); *G06F 3/0604* (2013.01); *G06F 3/0644* (2013.01); *G06F 3/0647* (2013.01); *G06F 3/0655* (2013.01); *G06F 3/0689* (2013.01)
(58) Field of Classification Search
None
See application file for complete search history.

(56) References Cited

U.S. PATENT DOCUMENTS

| | | | |
|---|---|---|---|
| 9,170,928 B1* | 10/2015 | Dantkale | G06F 12/0223 |
| 9,389,958 B2 | 7/2016 | Sundaram et al. | |
| 9,417,823 B2 | 8/2016 | Bennett et al. | |
| 10,514,982 B2 | 12/2019 | Wang et al. | |
| 11,768,623 B2 | 9/2023 | Sandvig | |
| 2012/0137098 A1* | 5/2012 | Wang | G06F 3/0647 |
| | | | 711/E12.002 |
| 2020/0133898 A1* | 4/2020 | Therene | G06F 3/0659 |
| 2022/0308766 A1* | 9/2022 | Onishi | G06F 3/0616 |

* cited by examiner

*Primary Examiner* — Charles J Choi
(74) *Attorney, Agent, or Firm* — BainwoodHuang (57) ABSTRACT

Techniques for processing write conflicts involve determining, in response to receiving a write operation for a stripe, a state of a backend operation of a stripe set, wherein the backend operation includes one of a rebuilding or re-striping operation. The techniques further involve stopping the write operation in response to the state of the backend operation indicating that the backend operation is being executed in the stripe. The techniques further involve executing the write operation in response to the state of the backend operation indicating that the backend operation is not being executed in the stripe. Accordingly, write conflicts between a write operation and a backend operation for the same stripe can be favorably avoided, and concurrent execution of the write operation and the backend operation simultaneously for the same stripe is prevented, thus preventing the deterioration of a storage system and improving storage system security and stability.

20 Claims, 7 Drawing Sheets

METHOD, DEVICE, AND COMPUTER PROGRAM PRODUCT FOR PROCESSING WRITE CONFLICTS

CROSS-REFERENCE TO RELATED APPLICATION

This application claims priority to Chinese Patent Application No. CN202310020620.0, on file at the China National Intellectual Property Administration (CNIPA), having a filing date of Jan. 6, 2023, and having "METHODS, APPARATUSES, AND COMPUTER PROGRAM PRODUCTS FOR PROCESSING WRITE COLLISIONS" as a title, the contents and teachings of which are herein incorporated by reference in their entirety.

TECHNICAL FIELD

Embodiments of the present disclosure generally relate to the field of data storage technologies, and more specifically, to a method, a device, and a computer program product for processing write conflicts.

BACKGROUND

Some existing data storage systems already provide a RAID (Redundant Array of Independent Disks) technology. RAID is a data storage virtualization/protection technology that combines multiple physical drives into a single logical unit to provide data redundancy and/or performance improvement. Depending on a redundancy level and performance required, data can be distributed across drives in one of several ways, which is called RAID level. Some RAID levels use data striping ("striping") to improve performance.

A series of adjacent logical sequential data blocks stored across different drives can be called a RAID "stripe." The overall data throughput can be improved by distributing data across multiple drives that can be accessed at the same time.

SUMMARY OF THE INVENTION

Embodiments of the present disclosure provide a method, a device, and a computer program product for processing write conflicts (or collisions).

In an aspect of the present disclosure, a method for processing write conflicts is provided. The method includes: determining, in response to receiving a write operation for a stripe, a state of a backend operation of a stripe set to which the stripe belongs, wherein the backend operation includes one of a rebuilding operation and a re-striping operation; stopping the write operation for the stripe in response to the state of the backend operation of the stripe set indicating that the backend operation is being executed in the stripe; and executing the write operation for the stripe in response to the state of the backend operation of the stripe set indicating that the backend operation is not being executed in the stripe.

In another aspect of the present disclosure, a device for processing write conflicts is provided. The device includes a processor and a memory coupled to the processor and having instructions stored therein, where the instructions, when executed by the processor, cause the device to execute the following actions: determining, in response to receiving a write operation for a stripe, a state of a backend operation of a stripe set to which the stripe belongs, wherein the backend operation includes one of a rebuilding operation and a re-striping operation; stopping the write operation for the stripe in response to the state of the backend operation of the stripe set indicating that the backend operation is being executed in the stripe; and executing the write operation for the stripe in response to the state of the backend operation of the stripe set indicating that the backend operation is not being executed in the stripe.

In still another aspect of the present disclosure, a computer program product is provided. The computer program product is tangibly stored on a non-transient computer-readable storage medium and includes computer-executable instructions, where the computer-executable instructions, when executed, cause a computer to execute the method or process according to the embodiments of the present disclosure.

It should be noted that the Summary of the Invention part is provided to introduce a series of concepts in a simplified manner, which will be further described in the Detailed Description below. The Summary of the Invention part is neither intended to identify key features or necessary features of the present disclosure, nor intended to limit the scope of the present disclosure.

BRIEF DESCRIPTION OF THE DRAWINGS

By means of description of embodiments of the present disclosure in more detail with reference to the accompanying drawings, the above and other objectives, features, and advantages of the present disclosure will become more apparent. In the drawings.

In all the drawings, the same or similar reference numerals often represent the same or similar elements.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the drawings show some embodiments of the present disclosure, it should be understood that the present disclosure can be implemented in various forms and should not be construed as limited by the embodiments described in this text. Rather, these embodiments are provided for a more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "including" and its variations should be understood as open-ended inclusion, i.e., "including but not limited to." The term "based on" should be understood as "at least in part based on." The term "an embodiment" or "the embodiment" should be understood as "at least one embodiment." The terms "first," "second," and the like may refer to different or identical objects, unless otherwise specifically indicated.

A stripe set (uber) is a management unit for managing physical resources in a distributed data storage system. Each stripe set in a storage system includes multiple stripes, stripe is a minimum unit that can be accessed by applications in the storage system, and data on a stripe can be distributed across drives with different physical addresses.

An input/output (I/O) for a stripe may include a frontend I/O such as a client I/O and a backend I/O such as a rebuilding I/O and a re-striping I/O. The client I/O includes a write operation from a client and a read operation from a client, and the backend I/O includes a backend read-write operation. The backend operation includes a rebuilding operation and a re-striping operation, the rebuilding operation is used for data transfer of a storage system, and the re-striping operation is used for storage expansion of a storage system.

In a storage system, a stripe allows concurrent read operations from a client. The client will serialize read operations and write operations for the stripe. From the perspective of the storage system, there is no need to handle the conflicts between the read operations and write operations from the client. For backend operations such as a rebuilding operation and a re-striping operation, all these backend operations are initiated and driven by the storage system itself. The design of the storage system requires that concurrent backend operations cannot be initiated for the same stripe. In addition, the backend operation will only write to a rebuilding location (or a target location of re-stripping), and the read operation from the client will not access these locations. Therefore, the backend operation and the read operation from the client will not generate a write conflict. However, both the write operation from the client and the backend operation can access the same stripe, causing a write conflict between the two. Such write conflict will deteriorate the storage system and is thus unacceptable. Therefore, simultaneous execution of the write operation from the client and the backend operation for the same stripe in parallel must be avoided.

For write conflicts between the write operation from the client and the backend operation for the same stripe, different consumers have implemented different locking mechanisms of different versions. These various locking mechanisms are not necessarily robust when facing the above-mentioned write conflicts, and are redundant, inefficient, and difficult to maintain. Therefore, it is necessary to propose an effective unified locking mechanism.

To at least solve at least some of the above and other potential problems, embodiments of the present disclosure provide a solution for processing write conflicts. The solution includes: determining, in response to receiving a write operation for a stripe, a state of a backend operation of a stripe set to which the stripe belongs, wherein the backend operation includes one of a rebuilding operation and a re-striping operation; stopping the write operation for the stripe in response to the state of the backend operation of the stripe set indicating that the backend operation is being executed in the stripe; and executing the write operation for the stripe in response to the state of the backend operation of the stripe set indicating that the backend operation is not being executed in the stripe. In this way, write conflicts between a write operation and a backend operation for the same stripe can be favorably avoided, and concurrent execution of the write operation and the backend operation simultaneously for the same stripe is prevented, so as to prevent the deterioration of a storage system and improve the security and stability of the storage system. Such unified solution can reduce the maintenance cost and make it easy to maintain.

The basic principles and some example implementations of the present disclosure are illustrated below with reference to FIG. 1 to FIG. 7. It should be understood that these example embodiments are given only to enable those skilled in the art to better understand and thus implement the embodiments of the present disclosure, and are not intended to limit the scope of the present disclosure in any way.

Figure 1:
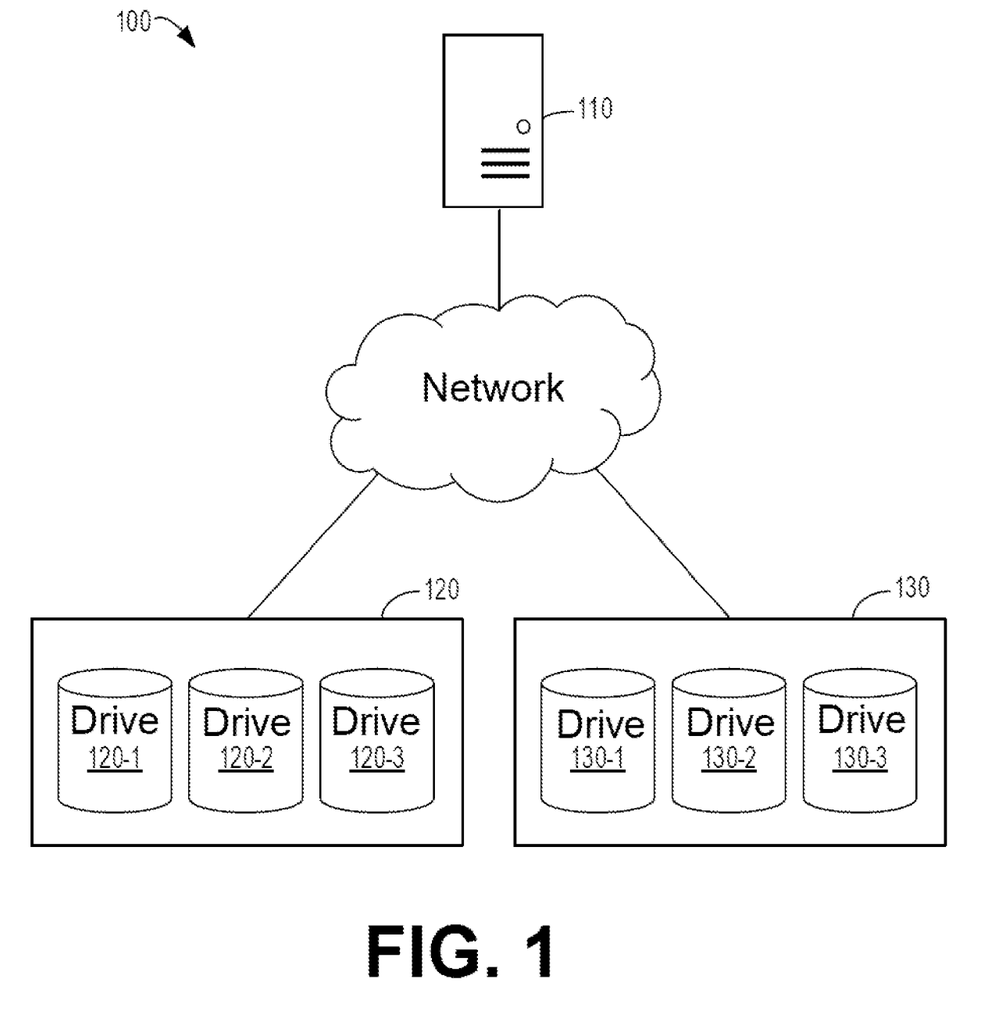
FIG. 1 is a schematic diagram of an example environment according to an embodiment of the present disclosure.

FIG. 1 shows a schematic diagram of example environment 100 according to an embodiment of the present disclosure. As shown in FIG. 1, example environment 100 generally relates to a distributed data storage system. Example environment 100 includes electronic device 100 and storage nodes 120 and 130 that are connected to each other (e.g., via a network).

By way of examples rather than limitation, electronic device 110 may be a device with computing power such as a personal computer, a workstation, a server, etc. The scope of the present disclosure is not limited in this regard. In some embodiments, electronic device 110 may access or perform operations on files stored on storage nodes 120 and 130 via a network, for example, creating files, reading files, writing files, deleting files, migrating files, etc.

Storage nodes 120 and 130 may include a cluster of storage devices, such as a drive array (i.e., a disk array). As shown in FIG. 1, storage node 120 includes a plurality of drives 120-1, 120-2, 120-3, etc., and storage node 130 includes a plurality of drives 130-1, 130-2, 130-3, etc. Each stripe set in the distributed data storage system includes multiple stripes, stripe is a minimum unit that can be accessed by applications in the distributed data storage system, and data on a stripe is distributed across these different drives. In example environment 100 such as a distributed data storage system, storage nodes 120 and 130 may be geographically distant from each other and may be collectively managed with the aid of the management software or hardware of the distributed data storage system. It should be understood that environment 100 may include more or fewer storage nodes, and storage node 120 or 130 may include more or fewer drives. The scope of the present disclosure is not limited in this regard.

Although example environment 100 is illustrated as a distributed data storage system, embodiments of the present disclosure may be implemented in different environments. For example, embodiments of the present disclosure may include an implementation in an environment with a single storage node.

Figure 2:
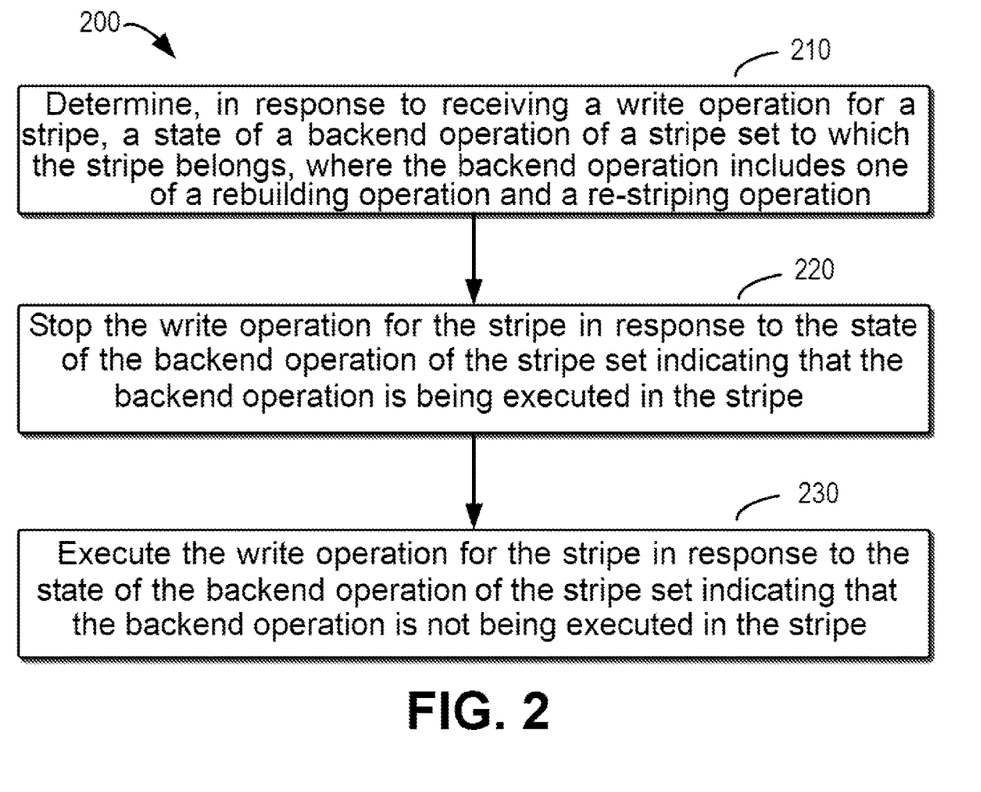
FIG. 2 is a schematic flow chart of a method for processing write conflicts according to an embodiment of the present disclosure.

In order to solve at least some of the above problems, according to embodiments of the present disclosure, a method for processing write conflicts is provided. FIG. 2 is a schematic flow chart of method 200 for processing write conflicts according to an embodiment of the present disclosure. Method 200 for processing write conflicts according to an embodiment of the present disclosure can process write conflicts between a write operation for a stripe and a backend operation for the stripe in a case where the write operation is received.

At 210, in response to receiving a write operation for a stripe, a state of a backend operation of a stripe set to which the stripe belongs is determined, where the backend operation includes one of a rebuilding operation and a re-striping operation. In a distributed data storage system, concurrent execution of a write operation from the client and a backend operation (such as a rebuilding operation and a re-striping operation) for the same stripe will cause write conflicts. Such write conflicts will deteriorate the storage system and are thus unacceptable. Therefore, simultaneous execution of the write operation from the client and the backend operation for the same stripe in parallel must be avoided.

Regarding this, when the write operation from the client for the stripe is received, according to an embodiment of the present disclosure, the state of the backend operation of the stripe set to which the stripe belongs is determined, so as to determine whether the backend operation is being executed in the stripe. According to an embodiment of the present disclosure, a list of backend operations for each stripe set in a storage system can be set. The list of backend operations of the stripe set indicates whether there is one or more backend operations for the stripe set, and in a case where there is one or more backend operations for the stripe set, the list of backend operations of the stripe set indicates the stripe in which the one or more backend operations are being executed. It is further described below how to use the list of backend operations of the stripe set to determine the stripe in which the backend operations are being executed.

It should be noted that a list of backend operations of a stripe set is used here to determine the state of the backend operation of the stripe set to which the stripe belongs; however, other records or statistics of the stripe set can also be used to determine the state of the backend operation of the stripe set to which the stripe belongs, which is not limited in the present disclosure. In addition, backend operations can be recorded or counted for each stripe so as to indicate a stripe in which the backend operation is being executed.

At 220, the write operation for the stripe is stopped in response to the state of the backend operation of the stripe set indicating that the backend operation is being executed in the stripe. As stated above, the write operation from the client and the backend operation for the same stripe cannot be simultaneously executed concurrently. Therefore, when the write operation from the client for the stripe is received, it is necessary to determine whether there is a backend operation which is being executed in the stripe so as to avoid write conflicts between the two. In a case where the state of the backend operation of the stripe set indicates that the backend operation is being executed in the stripe, according to an embodiment of the present disclosure, the received write operation from the client for the stripe is not executed, that is, the write operation from the client for the stripe is stopped.

According to the embodiment of the present disclosure, after it is determined that the backend operation is being executed in the stripe, the received write operation from the client for the stripe is not executed, and the received write operation from the client for the stripe can be added to a waiting list. According to the embodiment of the present disclosure, a write operation counter may be set for each stripe of the stripe set, and the write operation counter of the stripe indicates whether there is a write operation from the client for the stripe. When a write operation count of the write operation counter of the stripe is 0, it indicates that there is no write operation from the client for the stripe; and when the write operation count of the write operation counter of the stripe is 1, it indicates that there is a write operation from the client for the stripe. According to an embodiment of the present disclosure, after it is determined that the backend operation is not being executed in the stripe, the received write operation from the client for the stripe is executed. The write operation counter of the stripe can increase the write operation count of the stripe. When the write operation count of the stripe increases from 0 to 1, it indicates that a write operation from the client is being executed in the stripe.

At 230, the write operation for the stripe is executed in response to the state of the backend operation of the stripe set indicating that the backend operation is not being executed in the stripe. In a case where the state of the backend operation of the stripe set indicates that the backend operation is not being executed in the stripe, in other words, when it is determined that no backend operation is being executed in the stripe, the received write operation from the client for the stripe can be executed according to the embodiment of the present disclosure. Because it is determined that there is no backend operation for the stripe after the write operation from the client for the stripe is received, executing the received write operation from the client for the stripe will not cause write conflicts between the write operation from the client and the backend operation for the same stripe.

Figure 3:
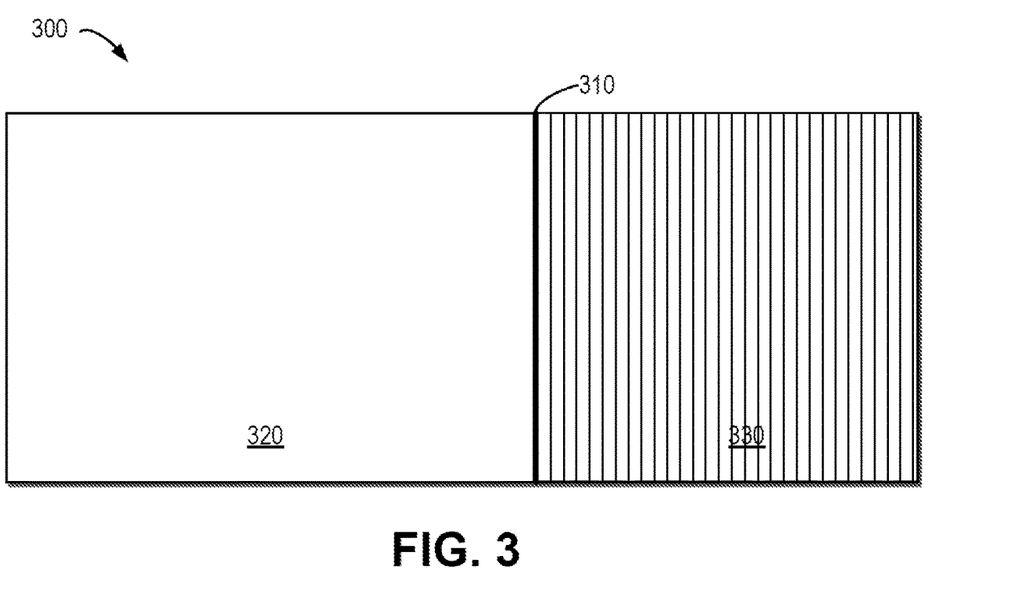
FIG. 3 is a schematic diagram of a backend operation check point of a stripe set according to an embodiment of the present disclosure.

It is further described below how to use a list of backend operations of a stripe set to determine a stripe in which a backend operation is being executed. FIG. 3 is a schematic diagram of backend operation check point 301 of a stripe set included in stripe set 300 according to an embodiment of the present disclosure.

A stripe set in a storage system is used as an example in FIG. 3 for description. It should be understood that (multiple) stripe sets included in the storage system should have the same or similar structures. As shown in FIG. 3, stripe set 300 includes multiple stripes (not specifically shown for the purpose of brief description) and backend operation check point 301. Backend operation check point 301 of stripe set 300 identifies stripe region 302 in stripe set 300 in which the backend operation is not completed and stripe region 303 in stripe set 300 in which the backend operation is completed. For stripe region 302 in which the backend operation is not completed, a stripe included in stripe region 302 does not complete execution of the backend operation; therefore, the backend operation is likely being executed in the stripe included in stripe region 302, and therefore, stripe region 302 in stripe set 300 in which the backend operation is not completed is the stripe region in stripe set 300 in which the backend operation may be being executed. In addition, for stripe region 303 in which the backend operation is completed, the stripe included in stripe region 303 has completed execution of the backend operation; therefore, the backend operation is not being executed in the stripe included in stripe region 303, and therefore, stripe region 303 in stripe set 300 in which the backend operation is completed is the stripe region in stripe set 300 in which the backend operation is not being executed. It should be understood that the arrangement of stripe region 302 in stripe set 300 in which the backend operation is not completed and stripe region 303 in stripe set 300 in which the backend operation is completed in FIG. 3 is illustrative rather than restrictive. According to the embodiment of the present disclosure, strip region 302 and strip region 303 can also include an opposite front and rear arrangement, up and down arrangement, or other arrangements.

According to the embodiment of the present disclosure, a stripe region in the stripe set in which the backend operation is not completed can be determined by searching for a backend operation check point of the stripe set. As stated above, because the backend operation is likely being executed in the stripe included in the stripe region in which the backend operation is not completed, determining the stripe region in the stripe set in which the backend operation is not completed is also determining the stripe region in the stripe set in which the backend operation is likely being executed.

According to the embodiment of the present disclosure, for the stripe region in the stripe set in which the backend operation is likely being executed, the stripe in which the backend operation is being executed can be determined by searching a list of backend operations of the stripe set. As stated above, a list of backend operations is set for each stripe set in a storage system. According to the embodiment of the present disclosure, each backend operation project in the list of backend operations of the stripe set records a target address and length of the backend operation, where the target address of the backend operation identifies an address of a stripe in which the backend operation is to be executed, and the target length of the backend operation corresponds to the length of the stripe in which the backend operation is to be executed. In a case where the list of backend operations of the stripe set is not null, it indicates that there is one or more backend operations for the stripe set. In this case, according to the embodiment of the present disclosure, for the stripe region in the stripe set in which the backend operation is likely being executed, the target address and length of the backend operation can be determined by searching the list of backend operations of the stripe set, and the stripe in which the backend operation is being executed can be determined based on the found target address and length of the backend operation. Regarding the stripe region in the stripe set in which the backend operation is not being executed (that is, the stripe region in the stripe set in which the backend operation is completed), there is no need to search the list of backend operations of the stripe set because no backend operation is possibly being executed in the stripe in such region.

According to the embodiment of the present disclosure, it can be determined whether the stripe in which the received write operation from the client is to be executed overlaps with the stripe in which the backend operation is to be executed, so as to determine, after the write operation from the client for the stripe is received, whether the backend operation is being executed in the stripe. In response to determining that the stripe in which the received write operation from the client is to be executed overlaps with the stripe in which the backend operation is to be executed, the received write operation from the client for the overlapped stripe is stopped. In this way, write conflicts between the write operation from the client and the backend operation for the overlapped stripe can be avoided.

According to the embodiment of the present disclosure, the backend operation for the stripe can be woken in response to determining that the backend operation for the stripe is waiting after execution of the write operation for the stripe is completed. During the execution of the write operation from the client for the stripe, there may be a to-be-executed backend operation for the stripe in the waiting list. In response to that there is a to-be-executed backend operation for the stripe in the waiting list, after the write operation from the client for the stripe is completed, the waiting backend operation for the stripe can be woken for execution.

Figure 4:
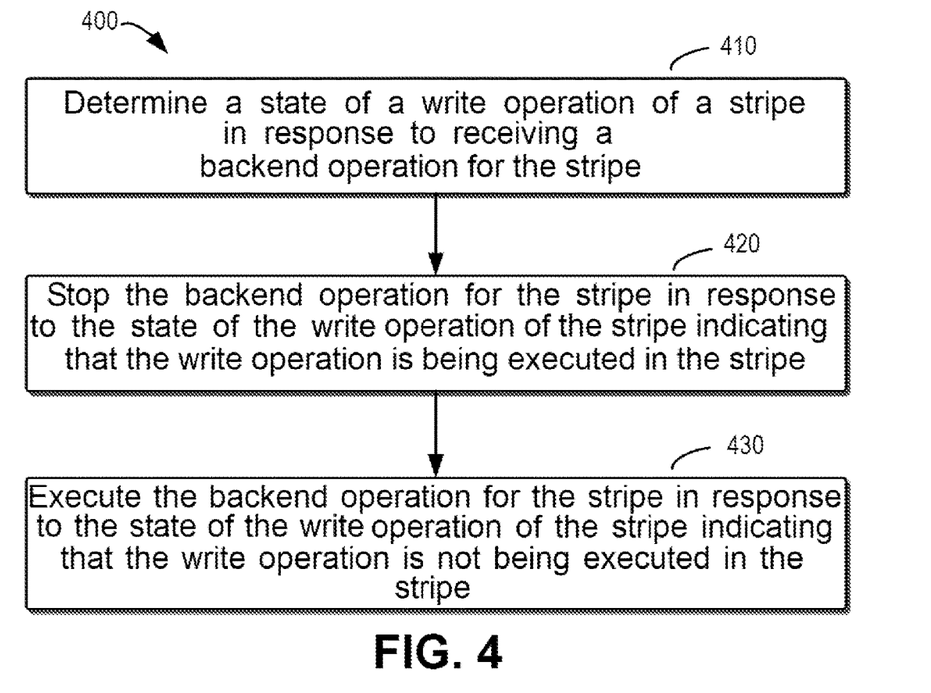
FIG. 4 is a schematic flow chart of a method for processing write conflicts in a case where a backend operation for a strip is received according to an embodiment of the present disclosure.

The method for processing write conflicts according to the embodiments of the present disclosure is also applicable for a case of receiving a backend operation for a stripe. FIG. 4 is a schematic flow chart of method 400 for processing write conflicts in a case where a backend operation for a strip is received according to an embodiment of the present disclosure. Method 400 for processing write conflicts can process write conflicts between backend processing for a stripe and the write operation for the stripe in a case where the backend processing is received.

At 410, a state of a write operation of a stripe is determined in response to receiving a backend operation for the stripe. When the backend operation for the stripe is received, according to the embodiment of the present disclosure, the state of the write operation of the stripe can be determined, so as to further determine whether the write operation from the client is being executed in the stripe. As stated above, a write operation counter is set for each stripe of the stripe set, and the write operation counter of the stripe indicates whether there is a write operation from the client for the stripe. When a write operation count of the write operation counter of the stripe is 0, it indicates that there is no write operation from the client for the stripe; and when the write operation count of the write operation counter of the stripe is 1, it indicates that there is a write operation from the client for the stripe.

When the backend operation for the stripe is received, according to the embodiment of the present disclosure, it is determined, by querying the write operation count of the stripe, whether the write operation from the client is being executed in the stripe. In other words, when the backend operation for the stripe is received, it is determined that the write operation from the client is being executed in the stripe in response to that the write operation count of the write operation counter of the stripe is found to be 1. It should be noted that although the state of the write operation of the stripe is determined by means of a write operation counter of a stripe, other records or statistics of the stripe can also be used to determine the state of the write operation of the stripe, which is not limited in the present disclosure.

At 420, the backend operation for the stripe is stopped in response to the state of the write operation of the stripe indicating that the write operation is being executed in the stripe. As stated above, the write operation from the client and the backend operation for the same stripe cannot be simultaneously executed concurrently. Therefore, when the backend operation for the stripe is received, it is necessary to determine whether there is a write operation from the client which is being executed in the stripe so as to avoid write conflicts between the two. In a case where the state of the write operation of the stripe indicates that the write operation from the client is being executed in the stripe, according to the embodiment of the present disclosure, the received backend operation for the stripe is not executed, that is, the backend operation for the stripe is stopped.

According to the embodiment of the present disclosure, after it is determined that the write operation from the client is being executed in the stripe, the received backend operation for the stripe can be added to a waiting list. As stated above, a list of backend operations is set for each stripe set in a storage system. When the list of backend operations of the stripe set is null, it indicates that there is no backend operation for the stripe set; and when the list of backend operations of the stripe set is not null, it indicates that there is one or more backend operations for the stripe set. According to the embodiment of the present disclosure, after it is determined that the write operation from the client is being executed in the stripe, the received backend operation for the stripe can be added to the list of backend operations of the stripe set to which the stripe belongs for waiting.

At 430, the backend operation for the stripe is executed in response to the state of the write operation of the stripe indicating that the write operation is not being executed in the stripe. In a case where the state of the write operation of the stripe indicates that the write operation from the client is not being executed in the stripe, in other words, when it is determined that no write operation from the client is being executed in the stripe, the backend operation for the stripe can be executed according to the embodiment of the present disclosure. Because it is determined that there is no write operation from the client for the stripe after the backend operation for the stripe is received, executing the received backend operation for the stripe will not cause write conflicts between the backend operation and the write operation from the client for the same stripe.

As stated above, after it is determined that a write operation from the client is being executed in the stripe, a received backend operation for the stripe is added to a list of backend operations of a stripe set to which the stripe belongs. According to the embodiment of the present disclosure, the list of backend operations of the stripe set may be located on a local node of the stripe set. That is, after it is determined that the write operation from the client is being executed in the stripe, the received backend operation for the stripe is added to the list of backend operations on a local node of the stripe set to which the stripe belongs. The embodiment of the present disclosure provides a dual-node locking mechanism. The dual-node mechanism is configured for each stripe set in the storage system, and is favorable for improving security and stability of the storage system. The dual-node locking mechanism according to the embodiment of the present disclosure is described in more detail with reference to FIG. 5 below.

Figure 5:
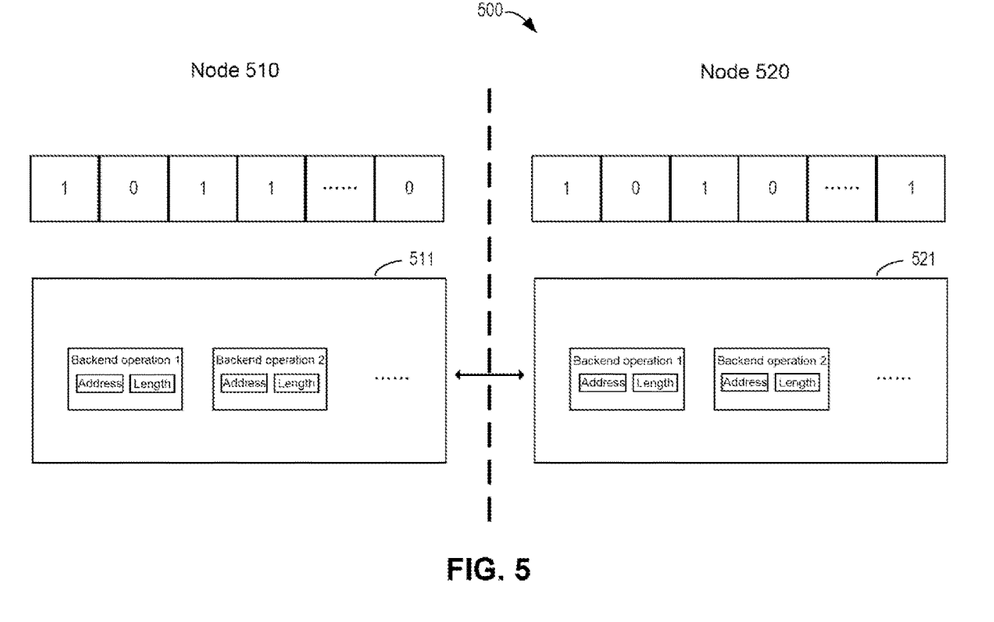
FIG. 5 is a schematic diagram of a dual-node locking mechanism according to an embodiment of the present disclosure.

FIG. 5 is a schematic diagram of dual-node locking mechanism 500 according to an embodiment of the present disclosure. As shown in FIG. 5, dual-node locking mechanism 500 configured for each stripe set in a storage system includes local node 510 and peer node 520 corresponding to local node 510. Local node 510 and peer node 520 each include a write operation counter of each stripe of a stripe set and a list of backend operations of the stripe set. According to the embodiment of the present disclosure, in response to a failure of a local node (such as local node 510) of the stripe set, a peer node (such as peer node 520) of the stripe set can be used to replace the local node.

As shown in FIG. 5, local node 510 and peer node 520 each include write operation counters of multiple stripes. These write operation counters correspond to corresponding stripes in the stripe set. It should be noted that the write operation counters of multiple stripes of local node 510 and the write operation counters of multiple stripes of peer node 520 can be arranged in the same order or arranged in different orders. As shown in an example embodiment of FIG. 5, the write operation counters of multiple stripes of local node 510 and the write operation counters of multiple stripes of peer node 520 are arranged in different orders.

As shown in FIG. 5, local node 510 and peer node 520 each include list 511 and list 521 of backend operations of the stripe set, and list 511 and list 521 of backend operations may include projects of backend operations for the stripe set. When list 511 and list 521 of backend operations of the stripe set of local node 510 and peer node 520 are not null, the projects of backend operations for the stripe set in list 511 and list 521 of backend operations include target addresses and lengths of the backend operations. The target address of a backend operation identifies an address of a stripe in which the backend operation is to be executed, and the target length of the backend operation corresponds to the length of the stripe in which the backend operation is to be executed. According to the embodiment of the present disclosure, a local node (such as local node 510) configured for the stripe set and a peer node (such as peer node 520) corresponding to the local node can share information related to backend operations for the stripe set. After receiving a backend operation for the stripe, backend operations for the stripe will be updated (such as addition or deletion) in the lists of backend operations on the local node and on the peer node configured for the stripe set to which the stripe belongs. A case in which a backend operation for a stripe is added to a list of backend operations of a stripe set to which the stripe belongs in response to receiving the backend operation for the stripe is described in more detail below. The case of deletion is similar to the case of addition which will be described, and will not be described below.

As stated above, after it is determined that a write operation from the client is being executed in the stripe, the received backend operation for the stripe is added to the list of backend operations on a local node of the stripe set to which the stripe belongs. According to the embodiment of the present disclosure, in response to adding the received backend operation for the stripe to the list of backend operations on the local node (such as 511 on local node 510) of the stripe set to which the stripe belongs, the list of backend operations on a peer node (such as 521 on peer node 520), corresponding to the local node, of the stripe set can be updated.

To enable the local node configured for the stripe set and the peer node corresponding to the local node to share information related to backend operations for the stripe set, according to the embodiment of the present disclosure, the local node (such as local node 510) can communicate with the peer node (such as peer node 520). With reference to FIG. 5, according to the embodiment of the present disclosure, after adding the received backend operation for the strip to list 511 of backend operations on local node 510 of the stripe set to which the stripe belongs, a message for indicating an update can be sent from local node 510 to peer node 520. Moreover, after receiving the message for indicating an update, the received backend operation for the stripe can be added to list 521 of backend operations on peer node 520 of the stripe set.

According to the embodiment of the present disclosure, the write operation for the stripe can be woken in response to determining that the write operation for the stripe is waiting after execution of the backend operation for the stripe is completed. During the execution of the backend operation for the stripe, there may be a to-be-executed write operation from the client for the stripe in the waiting list. In response to that there is a to-be-executed write operation from the client for the stripe in the waiting list, after the backend operation for the stripe is completed, the waiting write operation from the client for the stripe can be woken for execution.

For the convenience of understanding, an example process for processing write conflicts according to the embodiment of the present disclosure is provided below. It should be understood that the illustrated example process is not intended to limit the scope of the present disclosure, and the embodiments of the present disclosure may also include other examples of processing write conflicts.

Figure 6A:
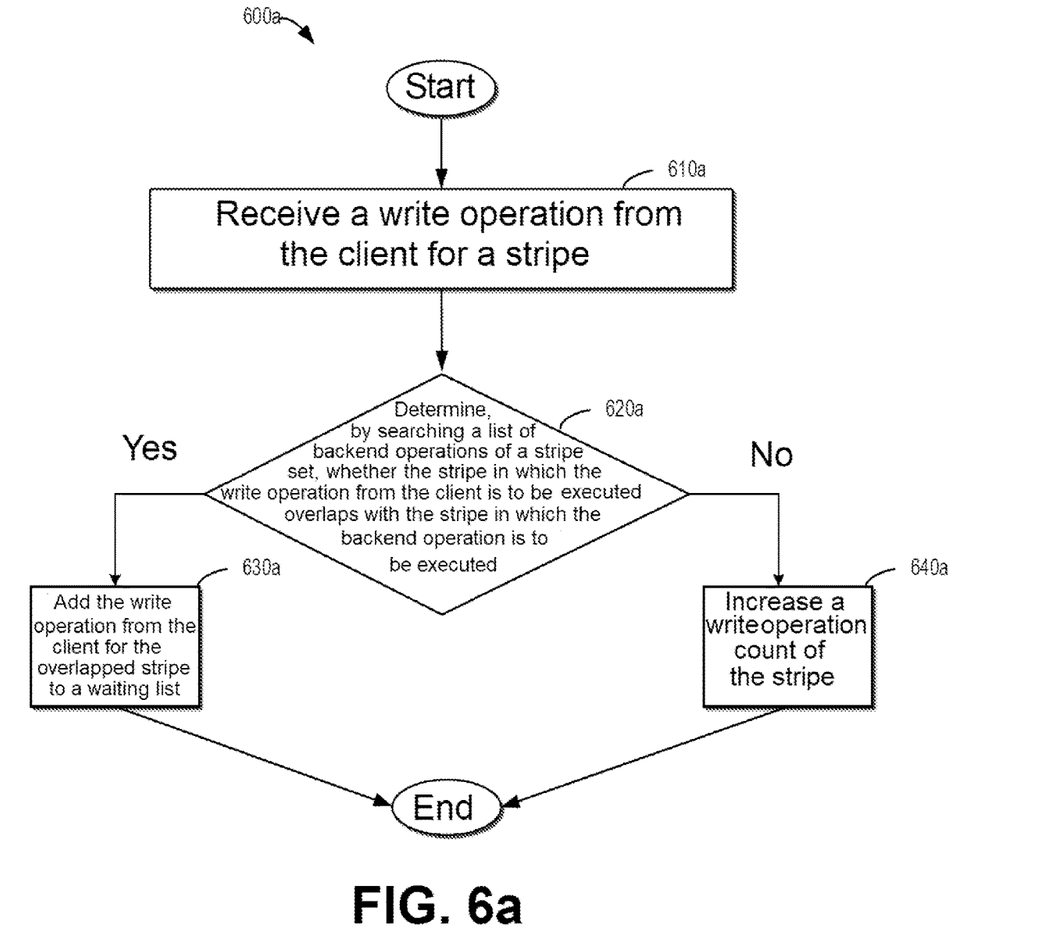
FIG. 6a shows an example process of processing write conflicts in a case where a write operation for a stripe is received according to an embodiment of the present disclosure.

FIG. 6*a* shows example process 600*a* of processing write conflicts in a case where a write operation for a stripe is received according to an embodiment of the present disclosure. As shown in FIG. 6*a*, at 610*a*, a write operation from the client for a stripe is received. At 620*a*, it is determined, by searching a list of backend operations of a stripe set to which the stripe belongs, whether the stripe in which the received write operation from the client is to be executed overlaps with the stripe in which the backend operation is to be executed. After it is determined that the stripe in which the received write operation from the client is to be executed overlaps with the stripe in which the backend operation is to be executed (that is, "yes" at 620*a*), the received write operation from the client for the overlapped stripe is added to a waiting list at 630*a*. In addition, after it is determined that the stripe in which the received write operation from the client is to be executed is not overlapped with the stripe in which the backend operation is to be executed (that is, "no" at 620*a*), a write operation count of the stripe is increased at 640*a*.

Figure 6B:
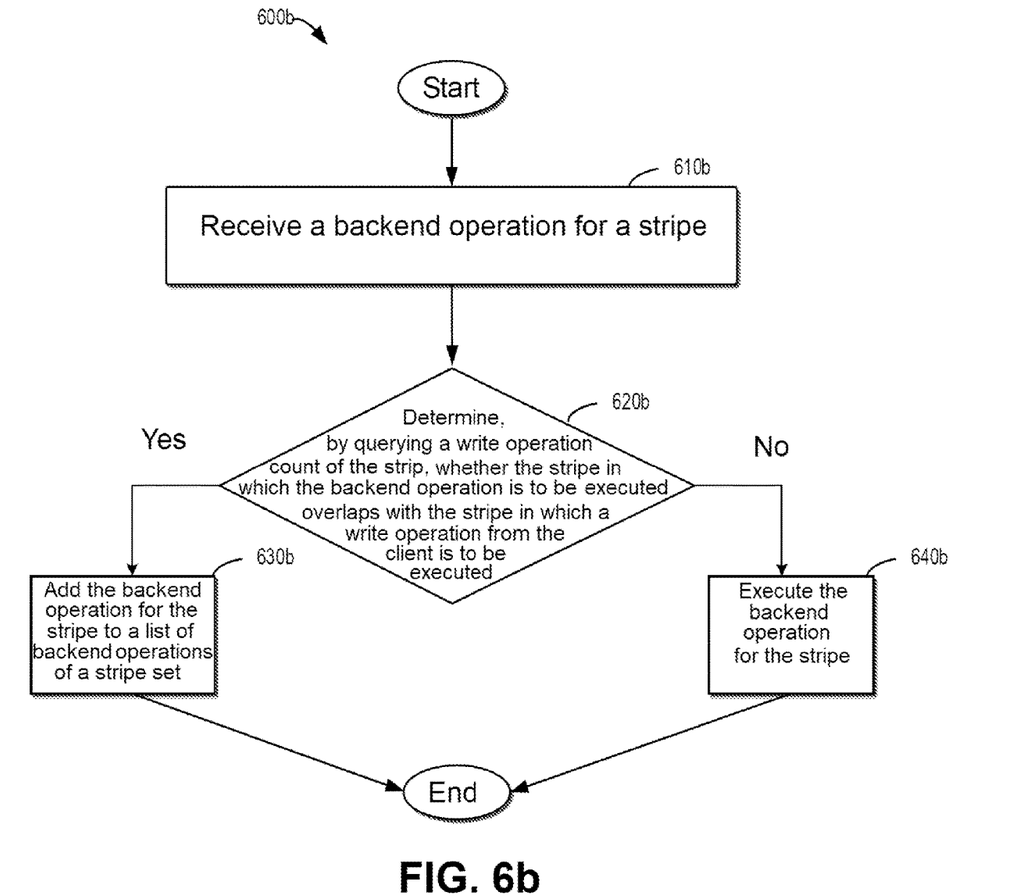
FIG. 6b shows an example process of processing write conflicts in a case where a backend operation for a stripe is received according to an embodiment of the present disclosure.

FIG. 6*b* shows example process 600*b* of processing write conflicts in a case where a backend operation for a stripe is received according to an embodiment of the present disclosure. As shown in FIG. 6*b*, at 610*b*, a backend operation for a stripe is received. At 620*b*, it is determined by querying a write operation count of the strip, whether the stripe in which the received backend operation is to be executed overlaps with the stripe in which a write operation from the client is to be executed. After it is determined that the stripe in which the received backend operation is to be executed overlaps with the stripe in which the write operation from the client is to be executed (that is, "yes" at 620*b*), at 630*b*, the received backend operation for the stripe is added to a list of backend operations of a stripe set to which the stripe belongs for waiting. In addition, after it is determined that the stripe in which the received backend operation is to be executed is not overlapped with the stripe in which the write operation from the client is to be executed (that is, "no" at 620*b*), the received backend operation for the stripe is removed from the list of backend operations of the stripe set to which the stripe belongs, and the received backend operation for the stripe is executed.

In conclusion, embodiments of the present disclosure provide a unified solution for processing write conflicts.

According to the embodiments of the present disclosure, the provided dual-node locking mechanism can avoid write conflicts between a write operation from the client and a backend operation for the same stripe, that is, stop concurrent execution of a write operation from the client and a backend operation for the same stripe in parallel, so as to prevent deterioration of the storage system and improve security and stability of the storage system.

Figure 7:
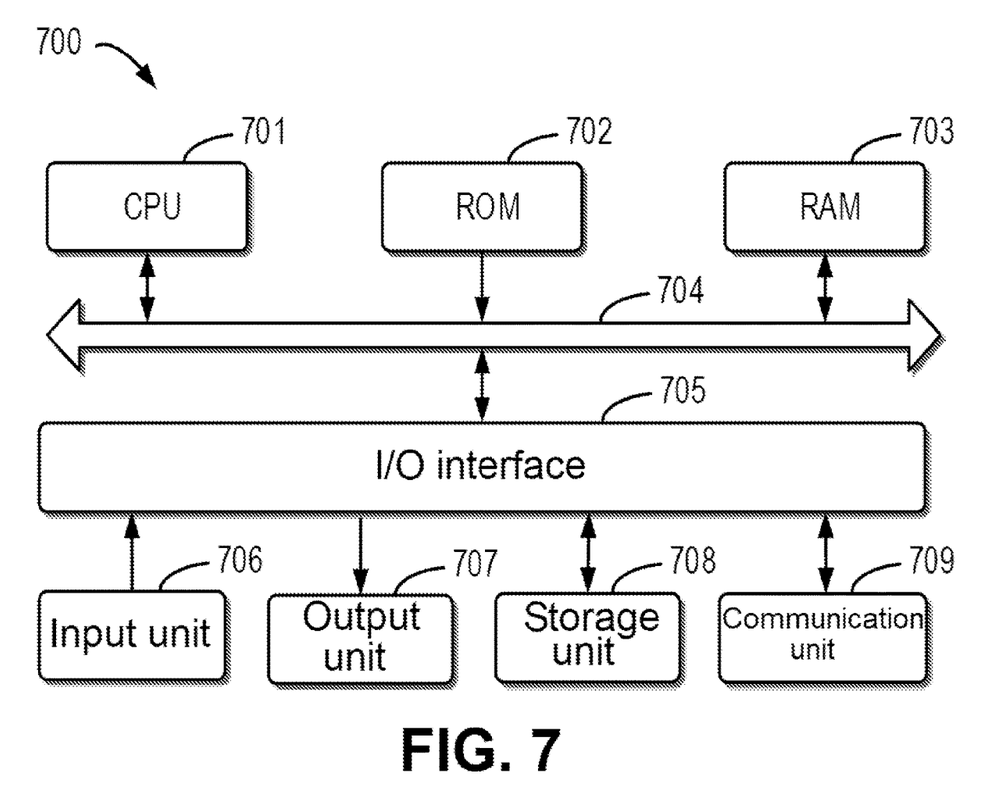
FIG. 7 is a schematic block diagram of example device 700 that may be used to implement some embodiments according to the present disclosure.

FIG. 7 is a schematic block diagram of example device 700 that may be used to implement some embodiments according to the present disclosure. As shown FIG. 7, device 700 includes central processing unit (CPU) 701, which may execute various appropriate actions and processing in accordance with computer program instructions stored in read-only memory (ROM) 702 or computer program instructions loaded from storage unit 708 onto random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network such as the Internet and/or various telecommunication networks.

The various methods and processes described above, such as methods 200 and 400, may be performed by processing unit 701. For example, in some embodiments, methods 200 and 400 may be implemented as a computer software program that is tangibly included in a machine-readable medium, such as storage unit 708. In some embodiments, part or all of the computer program may be loaded and/or installed onto device 700 via ROM 702 and/or communication unit 709. When the computer program is loaded into RAM 703 and executed by CPU 701, one or more steps of methods 200 and 400 described above can be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method for processing write conflicts, comprising:
    determining, in response to receiving a write operation for a stripe, a state of a backend operation of a stripe set to which the stripe belongs, wherein the backend operation comprises one of a rebuilding operation and a re-striping operation;
    stopping the write operation for the stripe in response to the state of the backend operation of the stripe set indicating that the backend operation is being executed in the stripe; and
    executing the write operation for the stripe in response to the state of the backend operation of the stripe set indicating that the backend operation is not being executed in the stripe;

determining a state of a write operation of another stripe in response to receiving a backend operation for the other stripe;

stopping the backend operation for other stripe in response to the state of the write operation of the other stripe indicating that the write operation of the other stripe is being executed in the other stripe; and executing the backend operation for the other stripe in response to the state of the other write operation of the other stripe indicating that the write operation of the other stripe is not being executed in the other stripe; and wherein determining the state of the write operation of the other stripe comprises: determining, by querying a write operation count of the other stripe, whether the write operation of the other stripe is being executed in the other stripe, and the method further comprises:

adding the backend operation for the other stripe to a list of backend operations on a local node of the stripe set after it is determined that the write operation of the other stripe is being executed in the other stripe; and updating a list of backend operations on a peer node, corresponding to the local node, of the stripe set in response to adding the backend operation for the other stripe to the list of backend operations on the local node of the stripe set; and wherein the peer node of the stripe set is used to replace the local node in response to a failure of the local node of the stripe set.

2. The method according to claim 1, wherein determining the state of the backend operation of the stripe set to which the stripe belongs comprises:

determining, by searching a list of backend operations of the stripe set, whether the backend operation is being executed in the stripe.

3. The method according to claim 2, further comprising:

determining, by searching for a backend operation check point of the stripe set, a stripe region in the stripe set in which the backend operation is not completed, wherein the backend operation check point of the stripe set identifies a boundary between the stripe region in the stripe set in which the backend operation is not completed and a stripe region in which the backend operation is completed.

4. The method according to claim 3, further comprising:

determining, for the stripe region in the stripe set in which the backend operation is not completed, a target address and a target length of the backend operation by searching the list of backend operations of the stripe set; and determining, based on the target address and the length of the backend operation, a stripe in which the backend operation is being executed.

5. The method according to claim 2, further comprising:

adding the write operation for the strip to a waiting list after it is determined that the backend operation is being executed in the stripe; and increasing a write operation count of the stripe after it is determined that the backend operation is not being executed in the stripe.

6. The method according to claim 1, further comprising:

waking the backend operation for the stripe in response to determining that the backend operation for the stripe is waiting after execution of the write operation for the stripe is completed.

7. The method according to claim 1, wherein updating the list of backend operations on the peer node of the stripe set comprises:

sending, after adding the backend operation for the other stripe to the list of backend operations on the local node of the stripe set, a message for indicating an update from the local node to the peer node; and adding the backend operation for the other stripe to the list of backend operations on the peer node of the stripe set in response to receiving the message for indicating an update.

8. The method according to claim 1, further comprising:

waking the write operation for the stripe in response to determining that the write operation for the stripe is waiting after execution of the backend operation for the stripe is completed.

9. The method according to claim 1, wherein the backend operation of the stripe set to which the stripe belongs comprises the rebuilding operation, the rebuilding operation being constructed and arranged to rebuild data from the stripe and write the rebuilt data to a rebuilding location.

10. The method according to claim 1, wherein the backend operation of the stripe set to which the stripe belongs comprises the re-striping operation, the re-striping operation being constructed and arranged to write data from the stripe to a target location of re-striping during storage expansion.

11. The method according to claim 1, wherein a data storage system includes multiple physical drives; and wherein executing the write operation for the stripe comprises:

writing data across the multiple physical drives in accordance with a RAID (Redundant Array of Independent Disks) level.

12. The method according to claim 11, wherein the data storage system is a distributed data storage system having a set of storage nodes constructed and arranged to communicate with the multiple physical drives over a network; and wherein writing the data across the multiple physical drives in accordance with the RAID level comprises:

writing the data from a storage node of the distributed data storage system to the multiple physical drives through the network.

13. A device for processing write conflicts, comprising:

a processor; and a memory coupled to the processor and having instructions stored therein, wherein the instructions, when executed by the processor, cause the device to execute the following actions:

determining, in response to receiving a write operation for a stripe, a state of a backend operation of a stripe set to which the stripe belongs, wherein the backend operation comprises one of a rebuilding operation and a re-striping operation;

stopping the write operation for the stripe in response to the state of the backend operation of the stripe set indicating that the backend operation is being executed in the stripe;

executing the write operation for the stripe in response to the state of the backend operation of the stripe set indicating that the backend operation is not being executed in the stripe;

determining a state of the write operation of the stripe in response to receiving the backend operation for the stripe;

stopping the backend operation for the stripe in response to the state of the write operation of the stripe indicating that the write operation is being executed in the stripe; and executing the backend operation for the stripe in response to the state of the write operation of the stripe indicating that the write operation is not being executed in the stripe;

wherein determining the state of the write operation of the stripe comprises: determining, by querying a write operation count of the stripe, whether the write operation is being executed in the stripe, and the actions further comprise:

adding the backend operation for the stripe to a list of backend operations on a local node of the stripe set after it is determined that the write operation is being executed in the stripe; and updating a list of backend operations on a peer node, corresponding to the local node, of the stripe set in response to adding the backend operation for the stripe to the list of backend operations on the local node of the stripe set; and wherein the peer node of the stripe set is used to replace the local node in response to a failure of the local node of the stripe set.

14. The device according to claim 13, wherein determining the state of the backend operation of the stripe set to which the stripe belongs comprises:

determining, by searching a list of backend operations of the stripe set, whether the backend operation is being executed in the stripe.

15. The device according to claim 14, wherein the actions further comprise:

determining, by searching for a backend operation check point of the stripe set, a stripe region in the stripe set in which the backend operation is not completed, wherein the backend operation check point of the stripe set identifies a boundary between the stripe region in the stripe set in which the backend operation is not completed and a stripe region in which the backend operation is completed.

16. The device according to claim 15, wherein the actions further comprise:

determining, for the stripe region in the stripe set in which the backend operation is not completed, a target address and a length of the backend operation by searching the list of backend operations of the stripe set; and determining, based on the target address and the length of the backend operation, a stripe in which the backend operation is being executed.

17. The device according to claim 14, wherein the actions further comprise:

adding the write operation for the strip to a waiting list after it is determined that the backend operation is being executed in the stripe; and increasing a write operation count of the stripe after it is determined that the backend operation is not being executed in the stripe.

18. The device according to claim 13, wherein the actions further comprise:

waking the backend operation for the stripe in response to determining that the backend operation for the stripe is waiting after execution of the write operation for the stripe is completed.

19. The device according to claim 13, wherein updating the list of backend operations on the peer node of the stripe set comprises:

sending, after adding the backend operation for the stripe to the list of backend operations on the local node of the stripe set, a message for indicating an update from the local node to the peer node; and adding the backend operation for the stripe to the list of backend operations on the peer node of the stripe set in response to receiving the message for indicating an update.

20. A computer program product having a non-transitory computer readable medium which stores a set of instructions to process write conflicts; the set of instructions, when carried out by computerized circuitry, causing the computerized circuitry to perform a method of:

determining, in response to receiving a write operation for a stripe, a state of a backend operation of a stripe set to which the stripe belongs, wherein the backend operation comprises one of a rebuilding operation and a re-striping operation;

stopping the write operation for the stripe in response to the state of the backend operation of the stripe set indicating that the backend operation is being executed in the stripe; and executing the write operation for the stripe in response to the state of the backend operation of the stripe set indicating that the backend operation is not being executed in the stripe;

determining a state of a write operation of another stripe in response to receiving a backend operation for the other stripe;

stopping the backend operation for other stripe in response to the state of the write operation of the other stripe indicating that the write operation of the other stripe is being executed in the other stripe; and executing the backend operation for the other stripe in response to the state of the other write operation of the other stripe indicating that the write operation of the other stripe is not being executed in the other stripe; and wherein determining the state of the write operation of the other stripe comprises: determining, by querying a write operation count of the other stripe, whether the write operation of the other stripe is being executed in the other stripe, and the method further comprises:

adding the backend operation for the other stripe to a list of backend operations on a local node of the stripe set after it is determined that the write operation of the other stripe is being executed in the other stripe; and updating a list of backend operations on a peer node, corresponding to the local node, of the stripe set in response to adding the backend operation for the other stripe to the list of backend operations on the local node of the stripe set, wherein the peer node of the stripe set is used to replace the local node in response to a failure of the local node of the stripe set.

* * * * *